Patented May 6, 1952

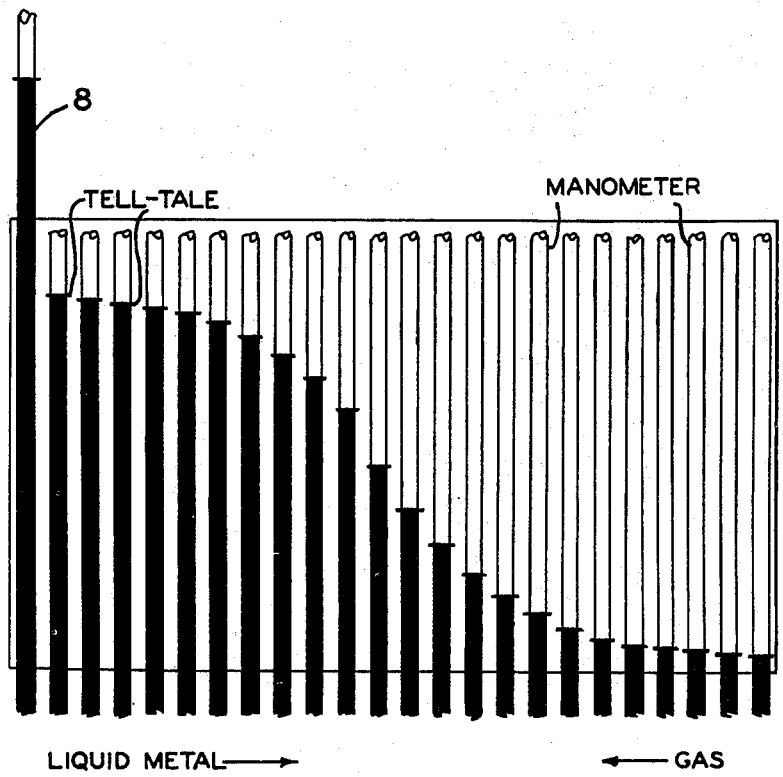

2,595,792

UNITED STATES PATENT OFFICE 2,595,792

METHOD OF OBSERVING AND CONTROLLING THE PROCESS OF A CONTINUOUS BESSEMER PROCESS

James Fernando Jordan, Huntington Park, Calif.

Application May 26, 1950, Serial No. 164,454

14 Claims. (Cl. 75—60)

My invention relates to the art of making steel.

The success of any continuous process is strictly dependent upon the adequacy of the method employed to control it. An adequate control method consists of means for observing the progress of the process, and means for regulating the process in accordance with the determinations made by the observing means. My invention has for an objective the observation of the progress of a continuous Bessemer process; another objective being a method of relating said observations to the regulation means which are available to such a process. Other objects will be apparent in the specification and claims.

The expression "air" is employed herein and in the claims to denote air, oxygen gas, concentrated oxygen gas, or air enriched by oxygen gas.

The expression "oxygen" is employed herein and in the claims to denote the reagent: oxygen.

In a continuous Bessemer process, the molten metal is confined to flow as a stream along a refractory trough as a series of air jets impinge into the flowing metal stream, said series of jets being spread out sufficiently along said stream within said trough to resolve the refining reactions into a series of refining zones which gradually blend into each other, each of said zones being characterized by the substantially similar free energy of the reactions taking place therein. In general, the silicon and manganese are oxidized in the first of these zones, together with a small amount of carbon. This first zone gradually blends into a second zone wherein the majority of the carbon is oxidized. If the process is being carried out under a basic slag, this decarburizing zone may be followed by a third zone wherein the phosphorus is oxidized.

Two methods of regulating this process are available: (1) by regulating the oxygen input into the flowing metal stream, and (2) by regulating the rate of input of raw iron into the flowing metal stream within the trough. Of these, the former seems preferable. The input of oxygen into the flowing metal stream may be regulated by regulating the amount of oxygen being introduced by means of the impinging air jets, or by regulating the input of iron oxide into the metal and/or slag, or by regulating the iron oxide content of the slag that lies in contact with the flowing metal, or by regulating several of these regulating means. Of these, the simplest procedure is to form said air jets by means of orifices which are all connected to the same manifold, and then, by regulating the air pressure within said manifold, regulating the input of oxygen into the flowing metal stream. However, whichever method of regulating the process is to be employed, it is first necessary to know just how the process is progressing.

In my application, Serial No. 745,853—filed on May 3, 1947, now abandoned, I proposed that the progress of the continuous Bessemer process be followed by observing the burning above the trough of the carbon monoxide arising from the process. The main difficulty with that control process lies in its wastage of the carbon monoxide; for, in burning said monoxide over the trough, the heat values arising therefrom are to a large extent lost to the process.

My present invention concerns my new method of observing the progress of, and tying said progress to, the continuous Bessemer process. My new control method eliminates the aforementioned difficulties, and has the further advantage of being more suitable for automatic control.

In my preferred embodiment, I provide the refining trough with a cover or roof that confines the gas arising from the stream of metal to flow out of said trough via a gas conduit defined by said roof, the sides of said trough, and the surface of the molten liquid within said trough. And I control the direction of flow of the confined gas out of said gas conduit by providing said conduit with a gas outlet at, or near, the metal entry end of said trough, and then, by withdrawing said gas out of said conduit via said outlet, I force said gas to flow out of said trough counter-current to the direction of flow of the metal stream as said metal stream flows thru said trough.

The impinging air jets employed to oxidize the impurities in the metal stream may be impinged into said stream from a position that lies above, below, or at the surface of said metal—positions which are generally referred to as surface, bottom or subsurface-blown oprations. The operation of a continuous Bessemer process that is bottom-blown differs considerably from a surface-blown operation, and the application of my control method to these two types of operation will be discussed separately.

With a bottom-blown operation, the oxygen content of the impinging air jets is immediately consumed in reaction with the molten metal, forming the reagent: FeO. As reaction with FeO resolves the refining action out along the flowing metal stream, the carbon content of said metal stream gradually changes from its original value to the value that characterizes the desired product. This results in the creation of a carbon concentration gradient along said metal stream within said trough. No matter what the composition of the incoming raw iron may be, or may change to during the course of time, this carbon concentration gradient must always be terminated at substantially the same carbon content if the process is to continue to produce the desired product—the terminal point of the carbon concentration gradient being either that point where said gradient has fallen to the desired carbon value or that point where the carbon content of the metal stream is substantially all eliminated—that is, has fallen to, say, 0.05% carbon.

Ordinarily, it is not enough to know the carbon level at which the process is terminating the carbon concentration gradient; for, with only that information at hand, the process operator must wait until his process deviates from normal before he can take steps to return the process to normal, resulting in the introduction of a serious time lag between the deflection of the process and the effective reaction on the part of the operator. Such a time lag greatly increases the size and duration of such variations as are inherent with the process. It is for this reason that the carbon concentration gradient all along the flowing metal stream is of extreme interest; for, to be able to watch this carbon concentration gradient all along the metal stream is to be forewarned of impending trouble in sufficient time to permit process adjustments to be made before deviations are reflected in the analysis of the product. Thus, in order to properly control whereat the process terminates the carbon concentration gradient, it is necessary to know just what is happening upstream from the terminal point.

I observe the carbon concentration gradient within the stream of metal within the trough by observing the carbon concentration gradient within the gas stream that is flowing counter-current to, above, and in contact with said metal stream; for, the carbon concentration gradient within said gas stream reflects the carbon concentration gradient within said metal stream, as shall be shown.

The expression "carbon concentration gradient" and the expression "carbon gradient" refer to the aforementioned carbon concentration gradient in the metal stream; the expression "gaseous carbon concentration gradient" and the expression "gaseous carbon gradient" refer to the aforementioned gaseous carbon concentration gradient in the gas stream.

With the gas arising from the decarburizing process being withdrawn from the gas conduit as fast as it is released by said process, and counter-currently to the stream of metal in contact with which it flows, the gas arising from any given stage of the refining process is prevented from contaminating the gas being released by any subsequent stage of the refining action, and the cumulative effect of more and more carbon monoxide being introduced into the gas stream as it flows thru said conduit results in the establishment of a gaseous carbon concentration gradient within said conduit, due to the compression of said gas and due to variations in the different stages of the process of the ratio of oxygen input to carbon monoxide release.

If the impinging jets consist of oxygen gas, then the gaseous carbon gradient of the gas stream arises from the compression of said monoxide as said conduit accumulates more and more monoxide. If the jets consist of air, then the gaseous carbon gradient arises from the aforementioned compression, being further modified by the fact that, while a substantially constant amount of nitrogen is being fed into and all along the conduit, the amount of carbon monoxide being released into said conduit depends upon the stage of the decarburizing process; that is, while practically all of the introduced oxygen escapes from the process as monoxide in those stages wherein the carbon content of the metal is high, practically none of the introduced oxygen is being released as a gas in those process stages wherein the carbon content of the metal stream is low—say, below 0.05%. And, between these two extremes lie oxygen-input to monoxide-release ratios which reflect the progress of the decarburizing process.

Due to the fact that a very rapid carbon oxidation rate continues right up to the point whereat substantially all carbon has been eliminated from the metal stream, when the carbon content of the metal stream has fallen to about 0.05% the introduction of carbon monoxide into the gas stream suddenly falls, resulting in a sharp break in the carbon content of said stream of gas.

The approach of this sudden break in the gaseous carbon gradient above the metal stream may be observed with the aid of a pressure-reading device of the type shown in the figure. The figure shows a series of manometers mounted on a board in the same rotation or sequence in which they are connected to the gas conduit, said manometers being connected to said conduit so that they measure or determine the gaseous carbon gradient by measuring the pressure gradient within said conduit. The manometers are shown connected to the conduit in the vicinity of, and upstream from, the terminal point of the process. Manometer 8 is connected to the gas conduit near the gas outlet, and, accordingly, registers the highest pressure in the system, said manometer 8 being employed to regulate the rate at which the gas is being withdrawn from the conduit—the rate of withdrawal being such that gas emerging from the metal stream immediately starts to flow out of the conduit by flowing along said conduit in a direction that is counter-current to the direction of flow of the metal stream thru the trough.

With the refining process regulated so that the desired product is being produced, the gaseous carbon gradient is noted by noting the pressure gradient within the gas conduit, an operation that is facilitated by employing tell-tales, as shown. If, now, the refining process deviates from normal, the fact will become immediately evident as the pressure gradient departs from the normal situation as established by the position of the tell-tales, and the process may be returned to normal by adjusting the input of oxygen or raw iron so as to return the pressure gradient to the normal position as established by the position of the tell-tales. It will be realized that, instead of measuring the pressure gradient in the vicinity of the aforementioned pressure break as shown in the figure, the pressure gradient may be measured all along the refining area, and that such measurements will yield a much more complete picture of the refining process than measurements in the restricted area shown in the figure.

The series of manometers is one way to measure the pressure gradient, other pressure-measuring methods being employable also. For example, the pressure gradient may be continuously measured with a multi-pen recorder; furthermore, such a multi-pen recorder may be connected to controllers which act to control the refining process in accordance with a preselected pressure pattern. The great advantage of such recorders is that they yield a continuous flow of information that can be obtained in no other manner.

In measuring the pressure gradient along the gas conduit, I act, in effect, to analyze the stream of gas for its carbon content at those specific locations whereat pressure readings are being made, for said pressure readings reflect the carbon content of the gas stream. For example, I may obtain a similar picture of the gaseous carbon gradient by actually analyzing samples of the gas stream withdrawn at locations along said stream. Even in a bottom-blown operation, the gas arising from and flowing above the metal stream will contain carbon dioxide in addition to carbon monoxide, and a picture of the gaseous carbon concentration gradient may be obtained by analyzing the aforementioned gas samples for either their carbon dioxide, or carbon monoxide content, or both. Or the gaseous carbon gradient may be determined by converting all dioxide in the gas samples to the monoxide before determining said monoxide, or converting all monoxide in the gas samples to the dioxide before determining said dioxide. To so determine the composition of the gas stream is to perform substantially the same operation as when said gas stream is analyzed by measuring its pressure gradient, for the pressure gradient may be calibrated to read in terms which reflect the actual composition of said gas stream; that is, for example, the pressure means may be calibrated to read in terms of the carbon monoxide content of the gas stream instead of pounds per square inch attributable to the total gas concentration within the conduit.

While my preferred embodiment envisions watching and controlling the gaseous carbon gradient all along the refining area, a continuous Bessemer process may be controlled by watching and controlling said gaseous carbon gradient in the immediate vicinity of the aforementioned pressure break that occurs at and immediately upstream from the point whereat the gaseous carbon gradient terminates at a value that characterizes the attainment of the desired carbon value in the molten metal stream lying thereunder, and a continuous Bessemer process may also be watched and controlled by watching the gas pressure or otherwise analyzing said gas at a single position or location immediately upstream from the terminal point of the process. The simplest arrangement is, of course, the latter method, wherein the process is watched and controlled with the aid of a single analyzing station, and, if the refining trough is flowing its product into a holding vessel wherein minor composition variations are averaged off, there is no particular reason why such a single station would not provide the process operator with sufficient information. However, if the process is expected to yield a uniform product, such as, for example, if the refining process yields a product that flows directly thru alloy make-up and then into a continuous casting machine, the single station method of control would probably not provide as close a control as might be desired. The more stringent are the product requirements, the farther upstream will the gaseous carbon gradient have to be watched.

The refining process may be controlled in the following manner: with sufficient oxygen being introduced into the flowing metal stream to lower the carbon content of the metal stream to approximately the desired value, and with the gas emerging from the process being withdrawn from the gas conduit at a rate of withdrawal that prevents gas emerging from one stage of the process from mixing with gas emerging from a subsequent stage of the process, said gas is analyzed at one or more locations along said conduit within the decarburizing area and upstream from the terminal point of the decarburizing process. The analysis of the gas may be made by the aforementioned measurements of the pressure exerted within said conduit by said gas at the selected location(s), or by determinations made by gasometric methods on gas samples withdrawn from the conduit at said location(s). Whatever the composition of the metal product may be, said gas analysis represents or reflects the production of said product, and, so long as the analysis of said gas at said location(s) does not change, the composition of the product will not change. If all variables remain substantially constant, the gaseous carbon gradient within said conduit will maintain its characteristics and location in accordance with the circumstances surrounding the process—that is, for example, the mode of introduction of oxygen into the flowing metal stream, and the product being produced by the process will be of uniform composition.

If it is desired to alter the carbon content of the product, the location of the gaseous carbon gradient along the flowing metal stream will have to be altered, an operation that may be performed in the same manner as when the gaseous carbon gradient is adjusted to allow for changes in the composition of the incoming raw iron. If, for example, the carbon content of the incoming raw iron starts to slowly rise, then the gaseous carbon gradient will start to move slowly downstream, due to the fact that the carbon concentration gradient is moving slowly downstream. This shift downstream will result in an increase in the carbon content of the product being produced. This downstream shift may be prevented or corrected by either introducing more oxygen or less raw iron into the process within the trough. If, on the other hand, the gaseous carbon gradient starts to move upstream—possibly as the result of a lower carbon content in the incoming raw iron, then the process may be returned to its normal operation by either decreasing the input of oxygen or increasing the input of raw iron. Although to do so would complicate the control operation, movements of the gaseous carbon gradient may be controlled by adjusting both the oxygen and the raw iron input into the process. By watching the movements of the gaseous carbon gradient at a location well upstream from the terminal point, and by making process adjustments immediately after a movement in the gaseous carbon gradient first evidences itself upstream, the process operator is in a position to prevent such movements from ever effecting the composition of the product.

While I have suggested that the regulation of the amount of oxygen being introduced into the flowing metal stream is best regulated by forming the air jets with orifices which are all connected to a common manifold into which the air is being fed on a controlled weight basis, oxygen input into the metal stream being regulated by regulating the weight of air being fed into said manifold, other arrangements are of course feasible. Thus, each air jet may be independently regulated, or the air jets may be regulated in groups. In the latter case, for example, the jets upstream from the first pressure-reading or analysis station along the gaseous carbon gradient may be controlled independently from the jets downstream from said first station, so that process variables may be corrected by adjusting these upstream jets while maintaining the downstream jets at a constant rate of oxygen input into the flowing metal stream. Still other arrangements are feasible, however, the principal object must always be to correct process variations before their effect reaches the terminal point of the decarburizing process.

In the continuous basic Bessemer process, the oxidizing process may or may not be stopped when the terminal point of the decarburizing process is reached; for, whether or not dephosphorization is complete ahead of or following the completion of decarburization depends upon the circumstances surrounding the operation. In general, dephosphorization will precede decarburization if the molten slag that lies in contact with the flowing metal stream during decarburization contains a high percentage of iron oxide, and if said molten slag is being fed into the process in sufficient quantity to hold the phosphorus that is oxidized before decarburization is complete. The aforementioned iron oxide content of the molten slag stream may be derived from the direct introduction of iron oxide into said slag stream, or by means of the oxidizing influence of air jets which impinge into the metal stream from a position that lies above the metal stream—in other words, in a surface or a subsurface-blown operation. If a measure of dephosphorization is being carried on after the carbon terminal point has been passed, then the input of oxygen into the process should be controlled so that said carbon terminal point is held at a preselected location along the trough, the completion of the dephosphorization being controlled by metering sufficient air into the metal stream, downstream from said carbon terminal point, to oxidize the known amount of phosphorus which remains to be oxidized following the attainment of said carbon terminal point.

In a bottom-blown operation, the gas flowing along the gas conduit will contain carbon monoxide and a small amount of carbon dioxide, such nitrogen and argon as may be contained in the impinging air jets, and, under certain circumstances, oxygen, hydrogen and/or water vapor. If oxygen escapes reaction with the metal stream and enters the gas conduit, it will ordinarily react at once with the carbon monoxide; however, within the reaction zone wherein silicon and manganese are being oxidized, considerable oxygen will escape into the gas conduit, and, due to the fact that the gas emerging from this phase of the operation is immediately withdrawn from the trough, at least a measure of this escaping oxygen may remain uncombined; furthermore, one modification of my process involves the maintenance of a controlled excess of oxygen within the gas stream within the conduit. The water content of the gas stream may arise from the use of air jets which are not dry, or from a reaction between oxygen and the hydrogen content of the incoming raw iron.

In the surface or subsurface-blown operations, the carbon dioxide content of the gas stream will be higher than in the bottom-blown operation—unless, of course, air is being introduced directly into the gas conduit in the bottom-blown operation.

While my method of watching the gaseous carbon gradient by pressure measurements tends to bulk all composition changes of the gas stream into a single value at each pressure-reading station, watching the gaseous carbon gradient by analyzing samples of the gas is more specific. While the gaseous carbon gradient may be defined by determining the carbon monoxide, the carbon dioxide, or both, analysis of the gas stream for other of its component may also be employed to, in effect, watch the gaseous carbon gradient; furthermore, the carbon monoxide and/or carbon dioxide determinations may be reported in any one of a number of ways, any one of which will reflect the information desired. The gaseous carbon gradient may be defined by determining the nitrogen content of the gas stream; for, as the carbon content of the gas stream rises, the nitrogen content of said gas stream falls. The carbon monoxide and/or carbon dioxide determinations may be reported in terms which represent the carbon content of the gas stream, the oxygen content of the monoxide and/or dioxide in the gas stream, the carbon content of the stream of metal lying immediately beneath the point whereat the sample was taken, or the total oxygen content of the gas stream; that is, the oxygen content of the carbon monoxide plus the oxygen content of the carbon dioxide, coupled with a determination of the oxygen content of the gas stream.

With the refining process being operated so that the gas evolved therefrom leaves the refining trough in the manners prescribed herein, changes in the location or character of the decarburizing process will be immediately reflected in the composition of the gas stream. Thus, while it is convenient to refer to such changes as changes in the gaseous carbon gradient, I may also refer to these composition changes as changes in the composition gradient of the gas stream.

The composition of the gas stream may be watched by any one of a number of gas-analysis methods. Thus, I may watch the gas stream by volumetric, thermal conductivity, electrical conductivity, optical, etc. methods of analysis; and the gas samples withdrawn from the gas conduit may be analyzed continuously or periodically.

The molten metal being bessemerized will always contain carbon; however, said molten iron may or may not contain other oxidizable impurities. Accordingly, I refer in my claims to the molten metal whose refinement is to be controlled by my present invention as: molten iron containing carbon.

The composition gradient that is a feature of the gas stream leaving my process may be formed by withdrawing the gas out of the gas conduit counter-current to the direction of flow of the metal stream thru the refining trough, and at a rate of withdrawal that prevents the gas arising from one stage of the refining action from mixing in any substantial manner with the gas arising from a subsequent stage in said refining action. While I prefer to achieve this gaseous composition gradient by withdrawing said gas out of said conduit via an opening at or near the metal-entry end of the refining trough and at a rate of withdrawal that results in the maintenance of a substantially uniform pressure of said gas within said conduit at the metal-entry end of the refining trough, other rates of withdrawal may be employed; however, the rate of withdrawal of the gas from the conduit must be at least fast enough to prevent any substantial concurrent flow of gas and metal, else the situation downstream may be masked by the situation upstream.

While the gaseous composition gradient may be watched far upstream, this is not essential. The most important information to be gleaned from the gaseous composition gradient lies in that portion of the decarburizing process lying between the carbon terminal point and the point along the flowing metal stream whereat the refining action is about half complete; for, it is in this latter stage of the refining action where the process variables start to take definite shape. Accordingly, my method of control may be entirely confined to said latter stage. Thus, the gas arising from the process may be withdrawn from the gas conduit at a point that lies midway in the decarburizing process, instead of at or near the metal-entry end of the trough. With this arrangement, the gas lying downstream from the midway withdrawal point flows along the gas conduit in a direction that is counter-current to the direction of flow of the metal stream, and the gas emerging from the process upstream from said midway withdrawal point flows along the gas conduit in a direction that is concurrent to the direction of flow of the metal stream. With this arrangement, the gaseous composition gradient lying downstream from said midway withdrawal point is employed to watch the completion of the process, the upstream gas being ignored insofar as control is concerned. In another arrangement, the gas conduit may be divided into two sections; one upstream from a midway point in the decarburizing process, and one downstream from said midway point, division between the two sections being caused by a suitable wall that permits the metal to flow thereunder while blocking the flow of gas between said two sections. In this arrangement, the gas arising from the upstream section may be withdrawn out of the upstream gas conduit in any convenient manner; the gas arising from the downstream section being withdrawn from the downstream gas conduit in a manner that causes said gas to flow counter-current to the flow of metal.

In addition to the described methods of watching the refining process by watching the gaseous composition gradient in the contra-flowing gas stream, a radioactive carbon may be employed to follow the process. Thus, if the incoming raw metal contains a suitable amount of a radioactive carbon, the flowing gas stream within the gas conduit will exhibit a radioactivity concentration gradient when examined by suitable counters located along the gas stream, and this radioactivity concentration gradient will reflect the carbon concentration gradient of the flowing metal stream; furthermore, by concentrating the carbon content of gas samples withdrawn from the gas stream—for example, by solid or liquid absorbents or by condensing the carbon oxide in a liquid air trap—the concentration of radioactivity in the gas samples may be increased, and the amount of radioactive carbon required to follow the process may be decreased.

The gas conduit employed in the counter-current and concurrent modifications of my process should be reasonably gas tight; that is, the roof over the trough should not be constructed in the crude, open manner that is employed with most metallurgical vessels. Probably the simplest method of sealing the roof of the gas conduit is to insulate it.

In the counter-current modification, no substantial concurrent flow of the gas and metal streams should be permitted in the zone wherein the gaseous carbon gradient is being observed for control purposes; however, my objectives may be attained by arranging the gas withdrawal means so that the gas emerging from the metal stream flows out of the trough in a direction that lies substantially at right angles to the direction of flow of the metal stream thru the trough; in other words, the gas flows away from the metal stream by rising straight up, a condition that is easily achieved if the gas from the process is allowed to burn freely over a refining trough that is not covered. As in the previously-described counter-current system, the carbon concentration gradient in the metal stream is reflected in the gaseous carbon gradient in the gas above and along said metal stream, and the continuous or periodic sampling and analysis of said gas will reveal whether or not said gaseous carbon gradient has, or is, moving, and movement of said gaseous composition gradient discloses a movement of the refining process that is taking place thereunder.

If it is desired to release the maximum amount of heat within a covered gas conduit by burning all evolved carbon monoxide to carbon dioxide, then it may be necessary to augment the oxidizing action of the impinging air jets by introducing additional air into the gas conduit; however, this additional air will not interfere with my control method so long as said additional air is introduced in a regular and controlled manner.

*Concurrent flow of gas and metal*

While I prefer to withdraw the gas evolved from the process out of the refining trough in a direction that lies counter-current or at right angles to the direction of flow of the metal stream thru the trough, my control method may be operated with the gas being withdrawn out of the trough in a direction that is concurrent to the direction of flow of the metal stream. With the concurrent arrangement, the gas is withdrawn out of the gas conduit at, or near, the metal-exit end of the trough. The described methods of analyzing the counter-current and at-right-angles gas streams may be employed to analyze the concurrent gas stream; for, while the composition gradient will be somewhat different with the concurrent arrangement, composition and pressure changes in said gas stream in the vicinity of the carbon terminal point will permit the progress of the process to be observed.

*Modifications*

The controlled flow of the gas evolved from the process is important to my control method only in the region lying in the vicinity of the carbon terminal point. Thus, in the counter-current modification, the gas evolved from the process may be withdrawn out of the gas conduit at a point that lies midway between the carbon terminal point and the metal-entry end of the trough, so that the gas evolved upstream from said midway withdrawal point flows out of the gas conduit concurrent with the metal stream and the gas evolved downstream from said midway withdrawal point flows out of the gas conduit counter-currently to the metal stream. In the modification wherein the process is observed by withdrawing the evolved gas out of the trough by permitting said gas to burn directly over the trough and stream of metal substantially at the point along said metal stream where said gas is evolved, the gas evolved upstream from the section wherein gas in being permitted to burn for control purposes may be prevented from so burning by covering this upstream section with a roof, so that the unburned gas may be withdrawn out of the trough without being permitted to contact the air lying thereover. Other modifications will occur to those skilled in the art.

Having now described several forms of my invention, I wish it to be understood that my invention is not to be limited to the specific form or arrangement of steps hereinbefore disclosed, or specifically covered in my claims.

I claim as my invention:

1. In the process wherein a stream of molten iron containing carbon is decarburized within a refractory trough with the aid of a series of air jets which are spread out along the stream of metal within said trough, the method of controlling said process, which comprises: withdrawing gas arising from said process directly out of said trough as a stream of gas whose carbon content at a location within said trough reflects the carbon content of said stream of metal at said location within said trough; and maintaining the carbon content of said stream of gas at a substantially-fixed level at said location within said trough by selectively increasing or decreasing the amount of oxygen being introduced into said stream of metal within said trough.

2. In the process wherein a stream of molten iron containing carbon is decarburized within a refractory trough with the aid of a series of air jets which are spread out along the stream of metal within said trough, the method of controlling said process, which comprises: withdrawing gas arising from said process directly out of said trough as a stream of gas whose carbon content at a location within said trough reflects the carbon content of said stream of metal at said location within said trough; and maintaining the carbon content of said stream of gas at a substantial-fixed level at said location within said trough by selectively increasing or decreasing the amount of molten iron containing carbon being introduced into said stream of metal within said trough.

3. In the process wherein a stream of molten iron containing carbon is decarburized within a refractory trough with the aid of a series of air jets which are spread out along the stream of metal within said trough, the method controlling said process, which comprises: withdrawing gas arising from said process directly out of said trough as a stream of gas whose carbon content at a location within said trough reflects the carbon content of said stream of metal at said location within said trough; and maintaining the carbon content of said stream of gas at a substantially-fixed level at said location within said trough by selectively increasing or decreasing the amount of a reactant being introduced into said stream of metal within said trough.

4. The method according to claim 3 in which the gas arising from said process is withdrawn out of said trough near the metal-entry end of said trough, so that said gas stream flows out of said trough counter-current to the flow of said metal stream along said trough.

5. The method according to claim 3 in which the gas arising from said process is withdrawn out of said trough near the metal-exit end of said trough, so that said gas stream flows out of said trough concurrent to the flow of said metal stream along said trough.

6. The method according to claim 3 in which the gas arising from said process is withdrawn out of said trough in a direction that lies substantially at right angles to the direction of flow of said metal stream along said trough.

7. The method according to claim 3 in which the gas arising from said process is divided into an upstream section and a downstream section, the downstream section being employed to control said process.

8. The method according to claim 3 in which the progress of said process is observed by measuring the pressure exerted by said stream of gas within said trough at a location that lies upstream from the terminal point of said process.

9. The method according to claim 3 in which the progress of said process is observed by measuring the pressure exerted by said stream of gas within said trough at a plurality of locations which lie upstream from the terminal point of said process.

10. The method according to claim 3 in which the progress of said process is observed by analyzing said stream of gas at a location that lies upstream from the terminal point of said process.

11. The method according to claim 3 in which the progress of said process is observed by analyzing said stream of gas at a plurality of locations which lie upstream from the terminal point of said process.

12. The method according to claim 3 in which the molten iron containing carbon contains a radioactive carbon and the progress of said process is observed by determining the radioactivity of said stream of gas at at least one location upstream from the terminal point of said process.

13. The method according to claim 12 in which said radioactivity of said stream of gas is determined by concentrating the radioactive carbon oxide gas and measuring the radioactivity of the concentrate.

14. The method according to claim 3 in which the composition of said gas stream at said preselected location along said trough is automatically maintained at said preselected location by analyzing said gas stream at said location with measuring means that is connected to means for controlling the input into said stream of metal of a reactant selected from the group consisting of oxygen, raw iron, and mixtures thereof.

JAMES FERNANDO JORDAN.

REFERENCES CITED

The following references are of record in the file of this patent:

UNITED STATES PATENTS

| Number | Name | Date |
|---|---|---|
| 2,365,553 | Hill | Dec. 19, 1944 |

FOREIGN PATENTS

| Number | Country | Date |
|---|---|---|
| 514,352 | Great Britain | Jan. 24, 1938 |